US010446816B2

(12) United States Patent
Lee et al.

(10) Patent No.: US 10,446,816 B2
(45) Date of Patent: Oct. 15, 2019

(54) BATTERY MODULE, AND BATTERY PACK COMPRISING SAME

(71) Applicant: LG CHEM, LTD., Seoul (KR)

(72) Inventors: Young-Ho Lee, Daejeon (KR); Jae-Yeong Kim, Daejeon (KR); Hyuk An, Daejeon (KR); Young-Sop Eom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/063,850

(22) PCT Filed: Sep. 22, 2017

(86) PCT No.: PCT/KR2017/010506
§ 371 (c)(1),
(2) Date: Jun. 19, 2018

(87) PCT Pub. No.: WO2018/093038
PCT Pub. Date: May 24, 2018

(65) Prior Publication Data
US 2018/0375078 A1    Dec. 27, 2018

(30) Foreign Application Priority Data

Nov. 17, 2016  (KR) .......... 10-2016-0153243

(51) Int. Cl.
*B60L 50/00*    (2019.01)
*H01M 2/10*    (2006.01)
(Continued)

(52) U.S. Cl.
CPC ....... *H01M 2/1083* (2013.01); *H01M 2/1077* (2013.01); *H01M 10/0413* (2013.01);
(Continued)

(58) Field of Classification Search
CPC .... H01M 2/1083; H01M 2/10; H01M 2/1077; B60L 50/50; B60L 50/66; B60L 11/1877
See application file for complete search history.

(56) References Cited

U.S. PATENT DOCUMENTS 4,883,725 A * 11/1989 Gerard ................ H01M 2/1072
429/99
6,326,103 B1 * 12/2001 Ido ........................ H01M 2/024
429/148

(Continued)

FOREIGN PATENT DOCUMENTS

EP    2 475 023 A1    7/2012
EP    3 255 700 A1    12/2017
(Continued)

OTHER PUBLICATIONS

International Search Report for PCT/KR2017/010506 (PCT/ISA/210) dated Jan. 11, 2018.

*Primary Examiner* — Hau V Phan
(74) *Attorney, Agent, or Firm* — Birch, Stewart, Kolasch & Birch, LLP (57) ABSTRACT

Disclosed is a battery module. The battery module includes: a battery cell stack in which a plurality of battery cells are stacked; a plurality of end plates at least partially surrounding the battery cell stack; and a support member coupled to the plurality of end plates and supporting the plurality of end plates.

13 Claims, 9 Drawing Sheets (51) Int. Cl.
*H01M 10/04* (2006.01)
*H01M 10/42* (2006.01)

(52) U.S. Cl.
CPC ... *H01M 10/0486* (2013.01); *H01M 10/4207* (2013.01); *H01M 2220/20* (2013.01)

(56) References Cited

U.S. PATENT DOCUMENTS

| | | | | |
|---|---|---|---|---|
| 7,614,469 | B2* | 11/2009 | Kumar | H01M 2/1077 180/68.5 |
| 8,512,889 | B1 | 8/2013 | Ahn | |
| 8,722,225 | B2* | 5/2014 | Kim | H01M 2/1077 429/155 |
| 8,999,557 | B2* | 4/2015 | Kim | H01M 2/1077 429/156 |
| 9,209,433 | B2* | 12/2015 | Kukel | H01M 2/1077 |
| 9,419,262 | B2* | 8/2016 | Kim | H01M 2/1077 |
| 2001/0030069 | A1* | 10/2001 | Misu | B60K 1/04 180/68.1 |
| 2002/0015880 | A1* | 2/2002 | Heimer | H01M 2/1072 429/97 |
| 2003/0017384 | A1* | 1/2003 | Marukawa | H01M 2/1077 429/120 |
| 2003/0017387 | A1* | 1/2003 | Marukawa | H01M 2/1077 429/156 |
| 2010/0000816 | A1* | 1/2010 | Okada | H01M 2/1077 180/68.5 |
| 2014/0356664 | A1 | 12/2014 | Jung | |
| 2014/0356690 | A1 | 12/2014 | Kim | |
| 2015/0171400 | A1 | 6/2015 | Shin et al. | |

FOREIGN PATENT DOCUMENTS

| | | |
|---|---|---|
| JP | 2004-349202 A | 12/2004 |
| JP | 2007-280890 A | 10/2007 |
| JP | 2012-164545 A | 8/2012 |
| JP | 2017-16799 A | 1/2017 |
| KR | 10-2011-0117585 A | 10/2011 |
| KR | 10-2013-0098212 A | 9/2013 |
| KR | 10-2014-0140380 A | 12/2014 |

* cited by examiner

BATTERY MODULE, AND BATTERY PACK COMPRISING SAME

TECHNICAL FIELD

The present application claims priority to Korean Patent Application No. 10-2016-0153243 filed on Nov. 17, 2016 in the Republic of Korea, the disclosure of which is incorporated herein by reference.

The present disclosure relates to a battery module and a battery pack including the same, and more particularly, to a battery module, which facilitates coupling of an end plate, and a battery pack including the same.

BACKGROUND ART

As mobile devices are technically developed and in increasing demand, the demand for secondary batteries as an energy source rapidly increases. Although nickel cadmium batteries or hydrogen ion batteries have been used as secondary batteries according to the related art, lithium secondary batteries, which are freely charged and discharged due to almost no memory effect as compared with nickel-based batteries and have extremely low self-discharge rate and high energy density, are widely used in recent years.

Such lithium secondary batteries mainly include a lithium-based oxide and a carbon material as a positive electrode active material and a negative electrode active material, respectively. Lithium secondary batteries include an electrode assembly, in which a positive electrode plate and a negative electrode plate respectively coated with a positive electrode active material and an negative electrode active material are arranged with a separator therebetween, and an exterior, that is, a battery case, in which the electrode assembly and an electrolyte are sealed and received.

Lithium secondary batteries include a positive electrode, a negative electrode, a separator interposed therebetween, and an electrolyte, and are classified into lithium ion batteries (LIBs), polymer lithium ion batteries (PLIBs), and the like, depending upon what are respectively used as a positive electrode active material and a negative electrode active material. Generally, a positive or negative electrode active material is coated on a current collector of aluminum or copper sheet, mesh, film, foil, or the like, and then dried, thereby forming electrodes of lithium secondary batteries.

In such secondary batteries, a battery cell is protected by using at least one of a cover, a case, and an end plate. That is, a battery cell is received in a cover, case, or end plate, thereby protecting the battery cell. In the case of secondary batteries according to the related art, a cover, a case, or an end plate is coupled by using various fastening members, for example, a long bolt or the like. However, to perform fastening by way of a fastening member such as a long bolt or the like, a fastening portion for a long, bolt needs to be formed in a cover, a case, or an end plate, and there are problems in that an overall size of a secondary battery is increased due to such a fastening portion for a long bolt, and that working time is increased due to a process for fastening a long bolt.

DISCLOSURE

Technical Problem

The present disclosure is designed to solve the problems of the related art, and therefore the present disclosure is directed to providing a battery module, which may facilitate fastening of an end plate and may reduce an overall size thereof, and a battery pack including the battery module.

In addition, the present disclosure is also directed to providing a battery module, which may reduce working time by simplifying a working process in coupling of an end plate, and a battery pack including the battery module.

Technical Solution

In one aspect of the present disclosure, there is provided a battery module including: a battery cell stack in which a plurality of battery cells are stacked; a plurality of end plates at least partially surrounding the battery cell stack; and a support member coupled to the plurality of end plates and supporting the plurality of end plates.

In addition, the plurality of end plates may respectively include a first bent portion and a second bent portion formed to be bent at ends thereof, and the support member may be coupled to the first bent portion and the second bent portion of the plurality of end plates.

In addition, a first coupling protrusion may be formed in the first bent portion, a second coupling groove may be formed in the second bent portion, and a first coupling groove coupled to the first coupling protrusion and a second coupling protrusion coupled to the second coupling groove may be formed in the support member.

In addition, the first coupling groove may be coupled to the first coupling protrusion from an upper side of the first bent portion, and the second coupling protrusion may be coupled to the second coupling groove from a lower side of the second bent portion.

In addition, each of the plurality of end plates may include a bent portion formed to be bent at an end thereof, at least one accommodation portion, in which an accommodation groove is formed, may be formed in the bent portion, and a catching portion, which is inserted into and coupled to the accommodation groove of the at least one accommodation portion, may be formed at each of both ends of the support member.

In addition, the catching portion may include a pair of catching hooks formed to be spaced apart from each other to face in opposite directions to each other.

In addition, an inclined portion may be formed in each of the pair of catching hooks to facilitate insertion into the accommodation groove.

In addition, a round portion may be formed in at least a portion of each of the pair of catching hooks.

In another aspect of the present disclosure, there are also provided a battery pack including the battery module set forth above, and a vehicle including the battery module set forth above.

Advantageous Effects

According to embodiments of the present disclosure, the end plate in the battery module may be easily fastened by way of the coupling protrusion and the coupling groove, and an overall size of the battery module may be reduced.

In addition, in coupling of the end plate by way of the coupling protrusion and the coupling groove, working time may be reduced by simplifying a working process.

BEST MODE

Hereinafter, a battery module and a battery pack including the battery module, according to preferred embodiments of the present disclosure, will be described in detail with reference to the accompanying drawings.

It should be understood that the terms used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation. Therefore, since embodiments described herein and configurations shown in the drawings are merely preferable examples and do not represent all technical aspects of the present disclosure, it should be understood that various equivalents and modified examples could be made without departing from the scope of the disclosure.

In the drawings, the size of each component or the size of a specific portion constituting each component may be exaggerated, omitted, or schematically illustrated for convenience and clarity. Therefore, the size of each component does not completely reflect the actual size thereof. When it is determined that descriptions of relevant functions or configurations known in the art may unnecessarily obscure the gist of the present disclosure, such descriptions will be omitted.

The term "coupling" or "connection" may be used herein in the case that one member is directly coupled or connected to another member, and also in the case that one member is indirectly coupled or connected to another member via a joint member.

Figure 1:
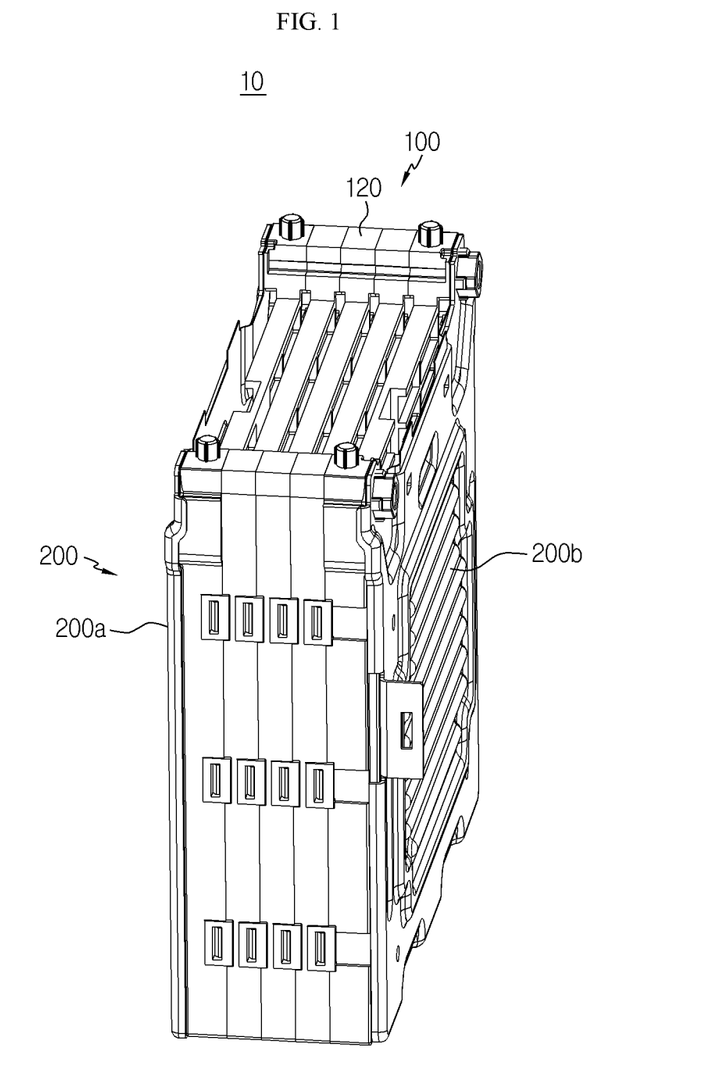
FIG. 1 is an assembled perspective view of a battery module according to a first embodiment of the present disclosure.
Figure 2:
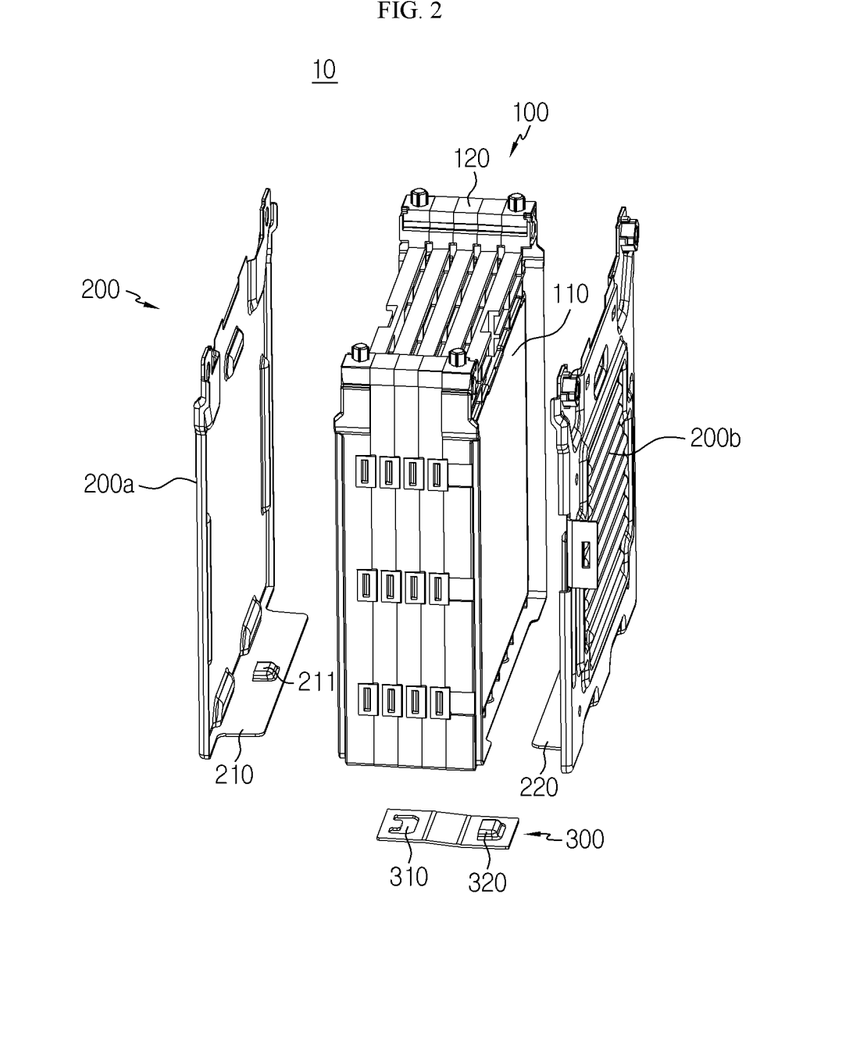
FIG. 2 is an exploded perspective view of the battery module according to the first embodiment of the present disclosure.
Figure 3:
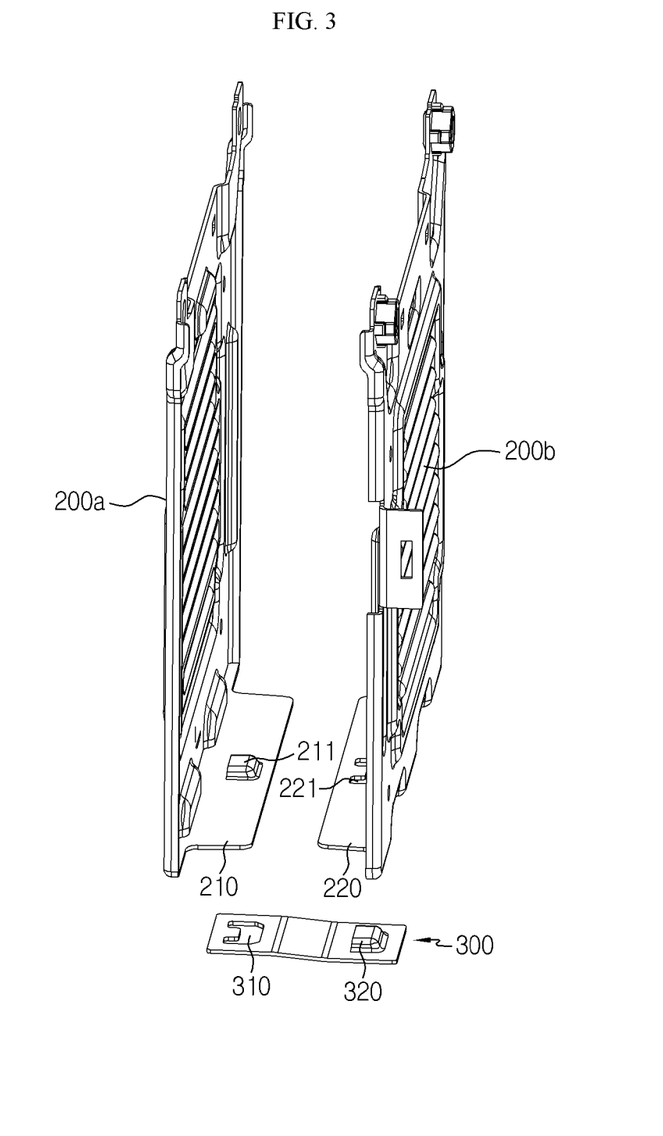
FIG. 3 is a perspective view illustrating that a support member is decoupled from an end plate in the battery module according to the first embodiment of the present disclosure.
Figure 4:
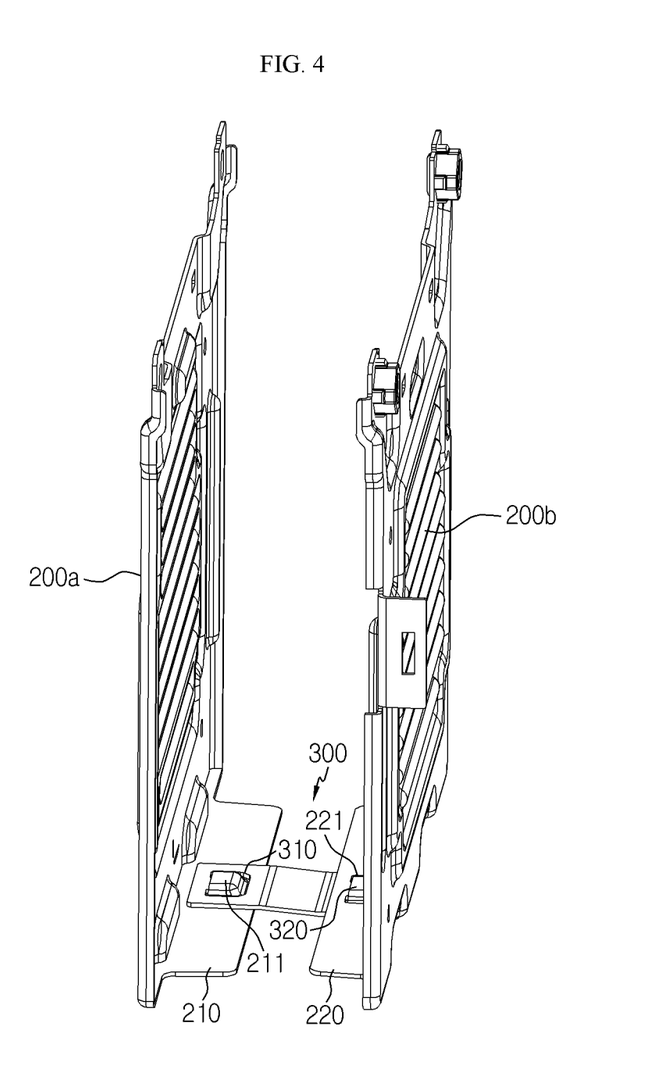
FIG. 4 is a perspective view illustrating that the support member is coupled to the end plate in the battery module according to the first embodiment of the present disclosure.
Figure 5:
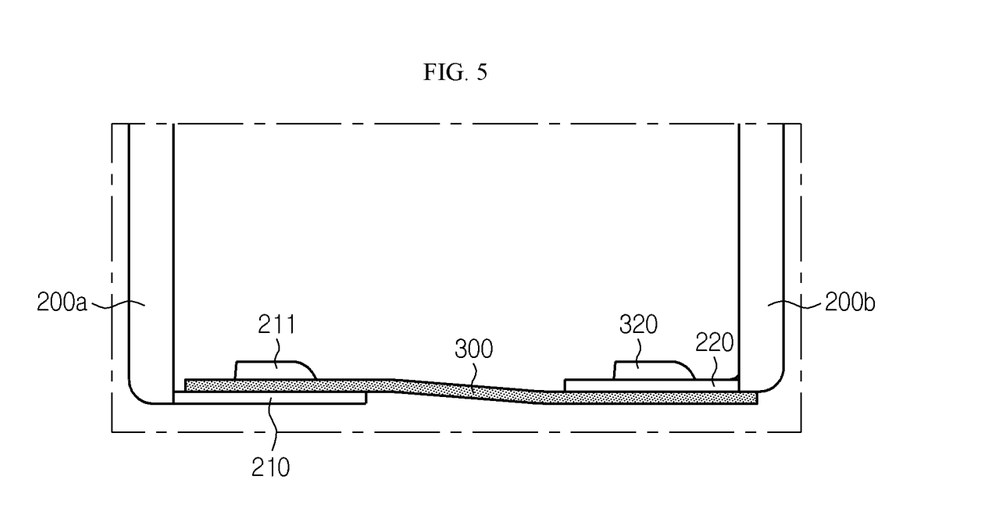
FIG. 5 is an enlarged side view illustrating that the support member is coupled to the end plate in the battery module according to the first embodiment of the present disclosure.

FIG. 1 is an assembled perspective view of a battery module according to a first embodiment of the present disclosure, FIG. 2 is an exploded perspective view of the battery module according to the first embodiment of the present disclosure, FIG. 3 is a perspective view illustrating that a support member is decoupled from an end plate in the battery module according to the first embodiment of the present disclosure, FIG. 4 is a perspective view illustrating that the support member is coupled to the end plate in the battery module according to the first embodiment of the present disclosure, and FIG. 5 is an enlarged side view illustrating that the support member is coupled to the end plate in the battery module according to the first embodiment of the present disclosure.

Referring to FIGS. 1 to 5, a battery module 10 according to the first embodiment of the present disclosure includes a battery cell stack 100, a plurality of end plates 200a and 200b, and a support member 300.

The battery cell stack 100 may be configured such that a plurality of battery cells 110 are stacked therein. Each battery cell 110 may have various structures, and the plurality of battery cells 110 may be stacked in various manners. The battery cell stack 100 may have a structure in which a unit cell obtained by arranging a positive electrode plate, a separator, and a negative electrode plate in this stated order, or a bi-cell obtained by arranging a positive electrode plate, a separator, a negative electrode plate, a separator, a positive electrode plate, a separator, and a negative electrode plate in this stated order is stacked in a plural number according to a battery capacity. In addition, each battery cell 110 may include an electrode lead. The electrode lead refers to a kind of terminal exposed externally to a battery cell 110 and connected to a device external thereto, and may include a conductive material. The electrode lead may include a positive electrode lead and a negative electrode lead. The positive electrode lead and the negative electrode lead may be arranged at opposite sides to each other with respect to a length direction of the battery cell 110, or arranged at the same side with respect to the length direction of the battery cell 110. The battery cell stack 100 may include a plurality of cartridges 120 receiving the battery cells 110. Each of the cartridges 120 may be manufactured by injection molding of plastics, and the plurality of cartridges 120, in which reception portions capable of receiving the battery cells 110 are formed, may be stacked. A cartridge 120 assembly, in which the plurality of cartridges 120 are stacked, may include a connector element or a terminal element. The connector element may include, for example, various types of electrical connection parts or members for connection to a battery management system (BMS, not shown) or the like, which may provide data regarding voltages or temperatures of the battery cells 110. In addition, the terminal element may include a positive terminal and a negative terminal as main terminals connected to the battery cell 110, and may have a terminal bolt and thus be electrically connected to an outside of the battery cell 110.

An end plate 200 may be provided in a plural number, and the plurality of end plates 200a and 200b are arranged to at least partially surround the battery cell stack 100. Here, the end plate 200 may include a case, cover or the like of various structures, which may be arranged to at least partially surround the battery cell 110 and thereby protect or support the battery cell 110. Referring to FIGS. 1 and 2, the cartridges 120, in which the battery cells 110 may be received, are stacked, and the end plate 120 is coupled to both ends of the cartridges 120. Here, if an example is described with reference to FIGS. 1 and 2, an upper portion of the end plate 200 may be coupled to the cartridges 120 by a bolt, and a lower portion of the end plate 200 may be coupled to the cartridges 120 by a support member 300 described below. However, this is merely an example, and both of the upper and lower portions of the end plate 200 may be coupled to the cartridges 120 by the support member 300. In addition, the upper portion of the end plate 200 may be coupled to the cartridges 120 by the support member 300, and the lower portion of the end plate 200 may be coupled to the cartridges 120 by a bolt. As such, both of the upper and lower portions of the end plate 200 may be coupled to the cartridges 120 by the support member 300, or at least one of the upper and lower portions of the end plate 200 may be coupled to the cartridges 120 by the support member 300, whereby, since the number of required bolts may be reduced, an overall size of the battery module 10 may be reduced, and a working process may be simplified. Hereinafter, the case that the upper portion of the end plate 200 is fastened by a bolt and the lower portion thereof is coupled by the support member 300 will be mainly described with reference to FIGS. 1 and 2 for convenience.

The support member 300 is coupled to the plurality of end plates 200a and 200b and thereby supports the end plate 200. The support member 300 may include various materials and may have various sizes and shapes. For example, as shown in FIGS. 1 to 3, the support member 300 may be configured as a member in a longitudinal direction, which may be located at a central region of two end plates 200a and 200b and connect the two end plates 200a and 200b to each other. Here, the number of end plates is merely an example, and the end plate 200 may be provided in various numbers.

Referring to FIGS. 1 to 5, the plurality of end plates 200a and 200b include a first bent portion 210 and a second bent portion 220 formed to be bent at ends thereof, respectively. In addition, the support member 300 is coupled to each of the first bent portion 210 and the second bent portion 220. For this purpose, a first coupling protrusion 211 is formed in the first bent portion 210, a second coupling groove 221 is formed in the second bent portion 220, and a first coupling groove 310 and a second coupling protrusion 320 are formed in the support member 300. In addition, the first coupling groove 310 of the support member 300 is coupled to the first coupling protrusion 211 of the first bent portion 210, and the second coupling protrusion 320 of the support member 300 is coupled to the second coupling groove 221 of the second bent portion 220. Referring to FIGS. 4 and 5, the first coupling groove 310 may be coupled to the first coupling protrusion 211 from an upper side of the first bent portion 210, and the second coupling protrusion 320 may be coupled to the second coupling groove 221 from a lower side of the second bent portion 220. As such, by a staggered coupling manner, facilitation of coupling may be improved, and coupling strength of the support member 300 may be improved. However, the present disclosure is not limited thereto, and both of the first coupling protrusion 211 and the second coupling protrusion 320 may be respectively coupled to first coupling groove 310 and the second coupling groove 221 from upper or lower sides of the first bent portion 210 and the second bent portion 220. In addition, coupling protrusions may be respectively formed in the first bent portion 210 and the second bent portion 220, and coupling grooves may be formed in the support member 300 to correspond to the coupling protrusions, or alternatively, the coupling grooves may be respectively formed in the first bent portion 210 and the second bent portion 220, and the coupling protrusions may be formed in the support member 300 to correspond to the coupling grooves. In this way, the support member 300 may be coupled to the end plate 200 even without use of a fastening member such as a bolt.

Figure 6:
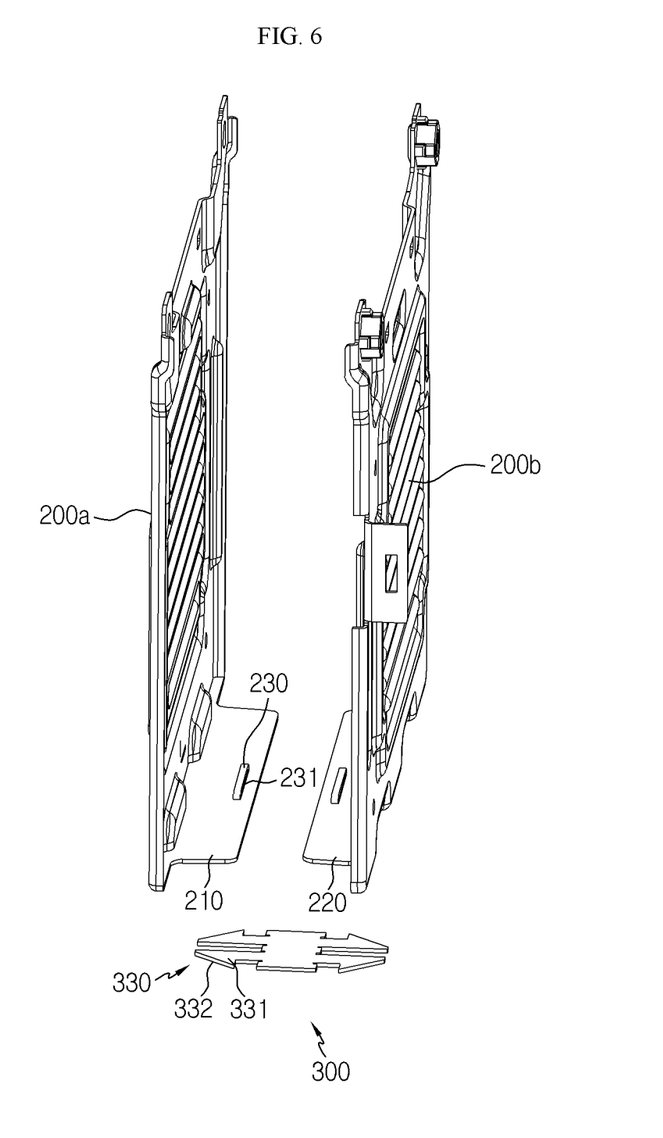
FIG. 6 is a perspective view illustrating that a support member is decoupled from an end plate in a battery module according to a second embodiment of the present disclosure.
Figure 7:
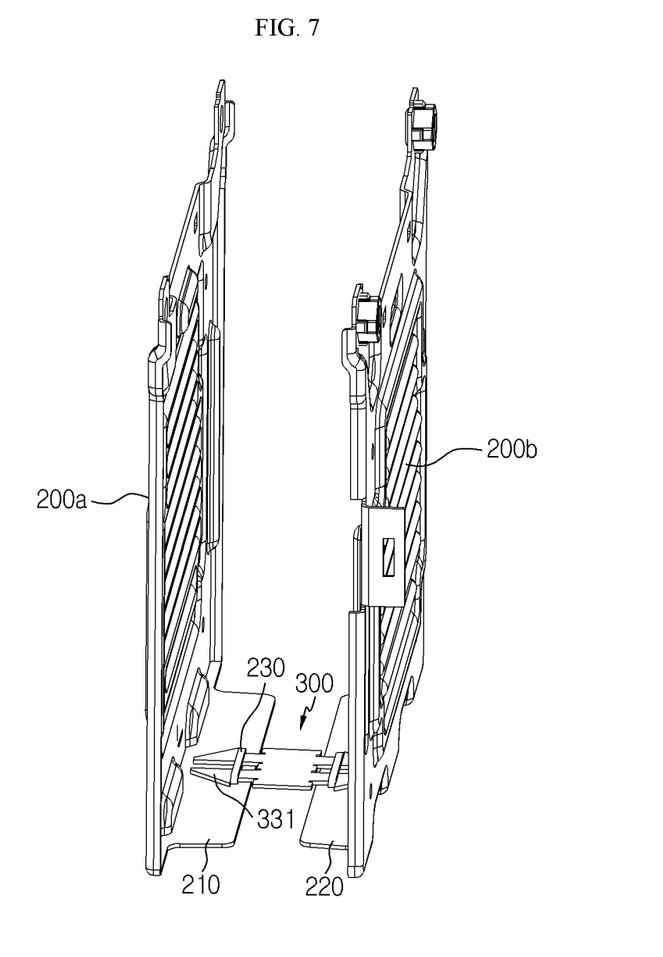
FIG. 7 is a perspective view illustrating that the support member is coupled to the end plate in the battery module according to the second embodiment of the present disclosure.

FIG. 6 is a perspective view illustrating that a support member is decoupled from an end plate in a battery module according to a second embodiment of the present disclosure. FIG. 7 is a perspective view illustrating that the support member is coupled to the end plate in the battery module according to the second embodiment of the present disclosure.

Hereinafter, the battery module 10 according to the second embodiment of the present disclosure will be described in detail with reference to drawings, and descriptions that are the same as in the battery module 10 according to the first embodiment of the present disclosure may be replaced by the previous descriptions and thus will be omitted.

The second embodiment of the present disclosure is different from the first embodiment in that an accommodation portion 230 is formed in each of the bent portions 210 and 220 of the end plate 200, and that a catching portion 330 is formed at both ends of the support member 300.

Referring to FIGS. 6 and 7, in the battery module 10 according to the second embodiment of the present disclosure, the plurality of end plates 200a and 200b respectively include the bent portions 210 and 220 formed to be bent at ends thereof, and the accommodation portion 230, in which an accommodation groove 231 is formed, may be formed in each of the bent portions 210 and 220. Here, the accommodation portion 230 may protrude from each of the bent portions 210 and 220 such that the accommodation groove 231 is formed. In addition, the catching portion 330 including a catching hook 331, which may be inserted into and coupled to the accommodation groove 231 of the accommodation portion 230, may be formed at each of two ends of the support member 300. Here, the two ends of the support member 300 may be symmetrically formed, without being limited thereto. Referring to FIG. 6, the catching hook 331 may be provided in a pair, and a pair of catching hooks 331 may be configured to be spaced apart from each other and face in opposite directions to each other. Here, an inclined portion 332 may be formed in the catching hook 331, and since the catching hook 331 is inserted into the accommodation groove 231 while the inclined portion 332 is guided along the accommodation portion 230, insertion of the catching hook 331 is facilitated. In addition, referring to FIG. 7, the pair of catching hooks 331 may be inserted into and coupled to the accommodation groove 231 formed in the accommodation portion 230, whereby the support member 300 may be coupled to the plurality of end plates 200a and 200b.

Figure 8:
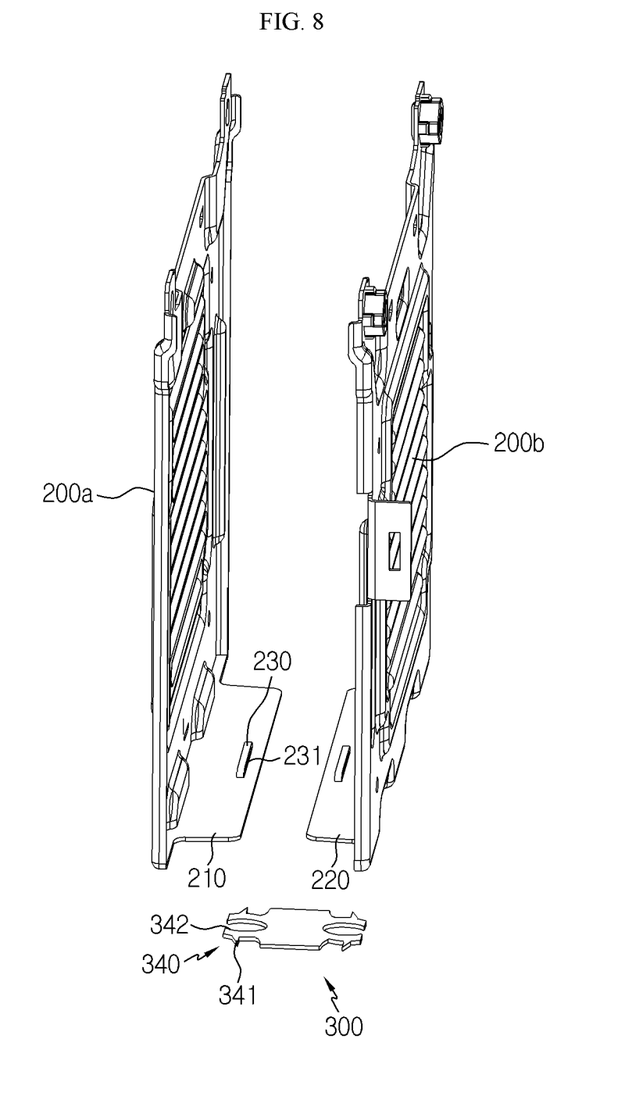
FIG. 8 is a perspective view illustrating that a support member is decoupled from an end plate in a battery module according to a third embodiment of the present disclosure.
Figure 9:
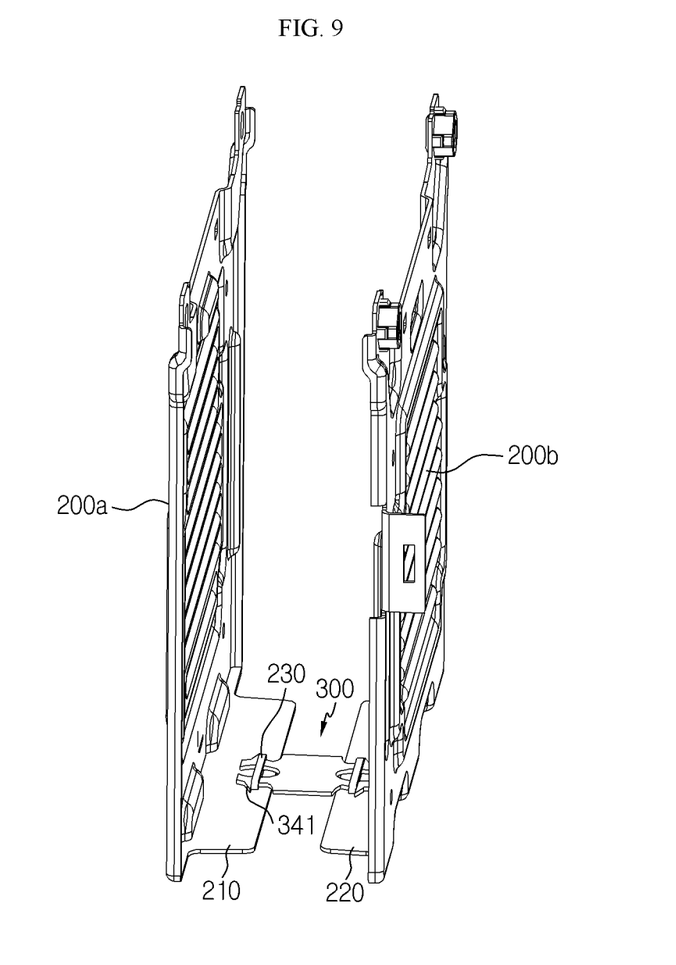
FIG. 9 is a perspective view illustrating that the support member is coupled to the end plate in the battery module according to the third embodiment of the present disclosure.

FIG. 8 is a perspective view illustrating that a support member is decoupled from an end plate in a battery module according to a third embodiment of the present disclosure, and FIG. 9 is a perspective view illustrating that the support member is coupled to the end plate in the battery module according to the third embodiment of the present disclosure.

Hereinafter, the battery module 10 according to the third embodiment of the present disclosure will be described in detail with reference to drawings, and descriptions that are the same as in the battery module 10 according to the first or second embodiment of the present disclosure may be replaced by the previous descriptions and thus will be omitted.

The third embodiment of the present disclosure is different from the second embodiment in that a round portion 342 is formed in at least a portion of a catching hook 341.

Referring to FIGS. 8 and 9, in the third embodiment, like in the second embodiment, the catching portion 340 including the catching hook 341, which may be inserted into and coupled to the accommodation groove 231 of the accommodation portion 230, may be formed at each of the two ends of the support member 300. In addition, although, like in the second embodiment, a pair of catching hooks 341 formed in the support member 300 are configured to be spaced apart from each other and face in opposite directions to each other, the round portion 342 is formed in at least a portion of each of the catching hooks 341. As such, if the round portion 342 is formed in the catching hook 341, there is a merit in that the catching hook 341 may be more softly inserted than in the second embodiment.

A battery pack (not shown) according to an embodiment of the present disclosure may include one or more battery modules 10 according to an embodiment of the present disclosure as set forth above. In addition, the battery pack (not shown) may further include, in addition to the battery modules 10, a case for receiving the battery modules 10, and various devices for controlling charge and discharge of the battery modules 10, for example, a BMS, a current sensor, a fuse, or the like.

A vehicle (not shown) according to an embodiment of the present disclosure may include the battery module 10 or the battery pack (not shown) set forth above, and the battery pack (not shown) may include the battery module 10. In addition, the battery module 10 according to an embodiment of the present disclosure may be applied to the vehicle (not shown), for example, a predetermined vehicle (not shown) configured to use electricity, such as an electric vehicle or a hybrid electric vehicle.

Heretofore, although the present disclosure has been described with reference to specific embodiments in conjunction with the accompanying drawings, it should be understood that the present disclosure is not limited by these embodiments, and that various modifications, changes, and equivalent embodiments can be made by one of ordinary skill in the art without departing from the scope of the present disclosure.

INDUSTRIAL APPLICABILITY

The present disclosure relates to a battery module and a battery pack including the battery module, and the battery module and the battery pack as set forth above may be particularly applied to industries related to secondary batteries.

What is claimed is:

1. A battery module comprising:
   a battery cell stack, the battery cell stack having a plurality of stacked battery cells;
   a plurality of end plates at least partially surrounding the battery cell stack; and
   a support member coupled to the plurality of end plates and supporting the plurality of end plates,
   wherein the plurality of end plates respectively comprise a first bent portion and a second bent portion formed to be bent at ends thereof, each of the first bent portion and the second bent portion having a first surface adjacent the battery cell stack and a second surface opposite the first surface, and
   wherein the support member is coupled to the first bent portion and the second bent portion of the plurality of end plates such that the support member directly contacts the first surface of the first bent portion and directly contacts the second surface of the second bent portion.

2. A battery pack comprising the battery module according to claim 1.

3. A vehicle comprising the battery module according to claim 1.

4. A battery module comprising:
   a battery cell stack, the battery cell stack having a plurality of stacked battery cells;
   a plurality of end plates at least partially surrounding the battery cell stack; and
   a support member coupled to the plurality of end plates and supporting the plurality of end plates,
   wherein the plurality of end plates respectively comprise a first bent portion and a second bent portion formed to be bent at ends thereof,
   wherein the support member is coupled to the first bent portion and the second bent portion of the plurality of end plates, and
   wherein a first coupling protrusion is formed in the first bent portion, a second coupling groove is formed in the second bent portion, and the support member has a first coupling groove coupled to the first coupling protrusion and a second coupling protrusion coupled to the second coupling groove.

5. The battery module according to claim 4, wherein the first coupling groove is coupled to the first coupling protrusion from an upper side of the first bent portion, and the second coupling protrusion is coupled to the second coupling groove from a lower side of the second bent portion.

6. A battery pack comprising the battery module according to-claim 4.

7. A vehicle comprising the battery module according to claim 4.

8. A battery module comprising:
   a battery cell stack, the battery cell stack having a plurality of stacked battery cells;
   a plurality of end plates at least partially surrounding the battery cell stack; and
   a support member coupled to the plurality of end plates and supporting the plurality of end plates,
   wherein each of the plurality of end plates comprises a bent portion formed to be bent at an end thereof,
   wherein at least one accommodation portion is formed in the bent portion, the at least one accommodation portion having an accommodation groove, and
   wherein a catching portion, which is inserted into and coupled to the accommodation groove of the at least one accommodation portion, is formed at each of both ends of the support member.

9. The battery module according to claim 8, wherein the catching portion comprises a pair of catching hooks formed to be spaced apart from each other to face in opposite directions to each other.

10. The battery module according to claim 9, wherein an inclined portion is formed in each of the pair of catching hooks to facilitate insertion into the accommodation groove.

11. The battery module according to claim 9, wherein a round portion is formed in at least a portion of each of the pair of catching hooks.

12. A battery pack comprising the battery module according to-claim 8.

13. A vehicle comprising the battery module according to claim 8.

* * * * *